United States Patent [19]

Zones

[11] Patent Number: 4,483,835
[45] Date of Patent: Nov. 20, 1984

[54] PROCESS FOR PREPARING MOLECULAR SIEVES USING IMIDAZOLE TEMPLATE
[75] Inventor: Stacey I. Zones, San Francisco, Calif.
[73] Assignee: Chevron Research Company, San Francisco, Calif.
[21] Appl. No.: 550,840
[22] Filed: Nov. 14, 1983
[51] Int. Cl.³ .............................................. C01B 33/20
[52] U.S. Cl. .................... 423/277; 423/326; 423/328; 423/329; 502/62; 502/77; 502/202
[58] Field of Search ............................... 423/326–329, 423/332, 277, 333, 335; 502/77, 62, 202

[56] References Cited
U.S. PATENT DOCUMENTS

| | | | |
|---|---|---|---|
| 3,702,886 | 11/1972 | Argauer et al. | 423/328 |
| 4,061,717 | 12/1977 | Kerr et al. | 423/328 |
| 4,076,842 | 2/1978 | Plank et al. | 423/328 |
| 4,251,499 | 2/1981 | Nanne et al. | 423/329 |
| 4,414,189 | 11/1983 | Kokotailo et al. | 423/328 |

FOREIGN PATENT DOCUMENTS

| | | |
|---|---|---|
| 57049 | 8/1982 | European Pat. Off. . |
| 77624 | 4/1983 | European Pat. Off. . |

OTHER PUBLICATIONS

Parker and Bibby, "Synthesis and Some Properties of Two Novel Zeolites, KZ-1 and KZ-2", Zeolites, vol. 3, Jan. 1983, pp. 8-11.

Primary Examiner—John Doll
Assistant Examiner—Jackson Leeds
Attorney, Agent, or Firm—S. R. La Paglia; W. K. Turner; J. W. Ambrosius

[57] ABSTRACT

Molecular sieves, particularly zeolites, of intermediate pore size are prepared using imidazole derivatives as templates.

10 Claims, No Drawings

PROCESS FOR PREPARING MOLECULAR SIEVES USING IMIDAZOLE TEMPLATE

BACKGROUND OF THE INVENTION

Natural and synthetic aluminosilicates are important and useful compositions. Many of these aluminosilicates are porous and have definite, distinct crystal structures as determined by X-ray diffraction. Within the crystals are a large number of cavities and pores whose dimensions and shapes vary from zeolite to zeolite. Variations in pore dimensions and shapes cause variations in the adsorptive and catalytic properties of the zeolites. Only molecules of certain dimensions and shapes are able to fit into the pores of a particular zeolite while other molecules of larger dimensions or difficult shapes are unable to penetrate the zeolite crystals.

Because of their unique molecular sieving characteristics, as well as their potentially acidic nature, zeolites are especially useful in hydrocarbon processing as adsorbents, and, as catalysts, for cracking, reforming, and other hydrocarbon conversion reactions. Although many different crystalline aluminosilicates have been prepared and tested, the search continues for new zeolites which can be used in hydrocarbon and chemical processing.

In recent years, many crystalline aluminosilicates having desirable adsorption and catalytic properties have been prepared. Typically, zeolites are prepared from reaction mixtures having sources of alkali or alkaline earth metal oxides, silica, and alumina. More recently, "nitrogenous zeolites" have been prepared from reaction mixtures containing an organic species, usually a nitrogen compound. Depending upon the reaction conditions and the composition of the reaction mixture, different zeolites can be formed even if the same organic species are used. For example, zeolites ZK-4, ZSM-4, faujasite and PHI, have all been prepared from tetramethylammonium solutions.

Although most experiments reported as producing nitrogenous zeolite have used fairly simple organic species such as tetra(n-alkyl)ammonium cations or alkylenediamines, several experiments are reported as using other organic species. U.S. Pat. No. 3,692,470, Ciric, Sept. 19, 1972, discloses preparing ZSM-10 from 1,4-dimethyl-1,4-diazoniabicyclo[2.2.2]octane. U.S. Pat. No. 3,783,124, Rubin et al., Jan. 1, 1974 discloses preparing a zeolite from benzyl trimethylammonium compounds. U.S. Pat. No. 3,832,449, Rosinski et al., Aug. 27, 1974, discloses preparing ZSM-12 from the reaction products of alkylene dihalides with complex amines or nitrogen heterocycles. U.S. Pat. No. 3,950,496, Ciric, Apr. 13, 1976, discloses preparing ZSM-18 from "tris" ammonium hydroxide (1,3,4,6,7,9-hexahydro-2,2,5,5,8,8-hexamethyl-2H-benzo[1,2-C:3,4-C':5,6-C'']tripyrolium trihydroxide). U.S. Pat. No. 4,000,248, Martin, Dec. 28, 1976 discloses preparing ferrierite using N-methylpyridine. U.S. Pat. No. 4,018,870, Whittam, Apr. 19, 1977, discloses preparing AG5 and AG6 using nitrogenous basic dyes. U.S. Pat. No. 4,251,499, Nanne, Feb. 17, 1981 discloses preparing ferrierite using piperidine or alkyl substituted piperidine. And, U.S. Pat. No. 4,285,922, Audeh, Aug. 25, 1981, discloses preparing ZSM-5 using 1-alkyl, 4 aza, 1-azaonia-bicyclo[2.2.2]octane, 4-oxide halides.

Theta-1 is an intermediate size pore zeolite that is described in European publication No. 0 057 049A1. Although this zeolite has shown good activity in certain hydrocarbon conversions, a process for preparing relatively pure crystals economically has not been available. The present invention is particularly useful for preparing intermediate size pore zeolite with X-ray diffraction patterns matching Theta-1.

SUMMARY OF THE INVENTION

The present invention is directed to a process or preparing molecular sieves, particularly those molecular sieves classified as intermediate pore size zeolites. The process is especially useful for preparing zeolites having a high silica to alumina ratio. In addition, the process allows the desired molecular sieve to be prepared at a lower temperature and with improved selectivity. In its broadest aspect, the invention is a method for preparing a molecular sieve having a mole ratio of a first oxide selected from silicon oxide, germanium oxide, and mixtures thereof to a second oxide selected from aluminum oxide, gallium oxide, boron oxide, and mixtures thereof greater than 15 which comprises:

(a) preparing an aqueous mixture containing a mole ratio of a source of a first oxide selected from silicon oxide, germanium oxide and mixtures thereof, to a source of a second oxide selected from aluminum oxide, gallium oxide, boron oxide, and mixtures thereof greater than 2, said mixture also containing sources of an imidazole salt characterized by the general structural formula:

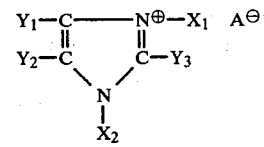

wherein $X_1$ and $X_2$ independently represent an alkyl, either branched or unbranched, substituted or unsubstituted, containing from 1 to about 10 carbon atoms, a cycloalkyl, either substituted or unsubstituted, having from about 5 to about 10 carbon atoms in the ring with said possible substitutions on the ring of the cycloalkyl being a branched or unbranched lower alkyl containing from 1 to about 4 carbon atoms, phenyl, benzyl, substituted phenyl, substituted benzyl, or a moiety represented by the formula:

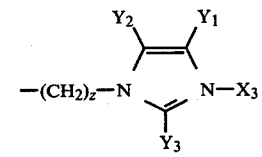

wherein
z is an integer of from 1 to about 20, $X_3$ independently represents the same moieties as represented by $X_1$ and $X_2$, and $Y_1$, $Y_2$ and $Y_3$ are the same as defined below, $Y_1$, $Y_2$, and $Y_3$ in the general formulas above independently represent hydrogen, halo, hydroxy, and lower alkyl, either branched or unbranched, containing from 1 to about 4 carbon atoms, or alternately $Y_1$ and $Y_2$ may be connected by the bridging group $C_4H_4$ to form a benzimidazole with the imidazole ring, $A^\ominus$ represents an anion which is not detrimental to the formation of the desired molecular sieve, and wherein further said aqueous mixture has a mole ratio of hydroxyl ion to the source of said first oxide within the range of from about 0.2 to about 0.6;

(b) maintaining the aqueous mixture at a temperature of at least 100° C. until the crystals of the desired molecular sieve form; and (c) recovering the crystals of the molecular sieve.

The term "molecular sieve" refers to a material prepared according to the present invention having a fixed, open-network structure, usually crystalline, that may be used to separate hydrocarbons or other mixtures by selective occlusion of one or more of the constituents.

The term "zeolite" refers to a molecular sieve containing a silicate lattice, usually in association with some alumina. In the following discussion, the terms molecular sieve and zeolite will be used more or less interchangeably, since most of the work was carried out on zeolites. However, one skilled in the art will recognize that the teachings relating to zeolites are also applicable to the more general class of materials called molecular sieves.

As used herein, the phrase "intermediate pore zeolite" refers to a zeolite having an average pore diameter falling within the range of from about 4.5 to about 6.0 Angstrom units.

The alkyl substitutions on the nitrogen atoms of the imidazole ring may be any straight chain or branched alkyl group having from 1 to about 10 carbon atoms. Thus, this moiety includes methyl, ethyl, propyl, isopropyl, n-butyl, t-butyl, s-butyl as well as derivatives of pentyl, hexyl, heptyl, octyl, nonyl, decyl, etc. The term "substituted alkyl" refers to an alkyl in which one or more hydrogens are substituted by a hydroxy, bromo, chloro, or iodo. If the moiety is a cycloalkyl, the cycloalkyl ring may be also substituted with a lower alkyl, i.e., an alkyl having no more than about 4 carbon atoms. Thus, the cycloalkyls include cyclopentyl, cyclohexyl, cycloheptyl, cyclooctyl, cyclononyl and cyclodecyl, as well as alkyl substituted moieties such as 4-methylcyclohexyl, etc. The terms "substituted phenyl" and "substituted benzyl" refer to an unsaturated ring moiety containing 1 or more lower alkyl (1–4 carbon atoms) substitutions on the ring carbons. As used herein, "halo" refers to a nonmetallic element from the seventh group of the Periodic Table, e.g., chlorine, bromine, iodine.

In addition, the substitutions of the $Y_1$ and $Y_2$ positions may form the bridging group $C_4H_4$ which in association with the imidazole ring forms a benzimidazole represented by the general formula:

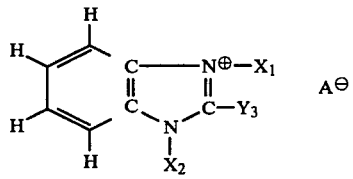

wherein $X_1$, $X_2$, $Y_3$ and $A^\ominus$ represent the same moieties as defined above.

It has also been found that a polymeric derivative represented by the general formula:

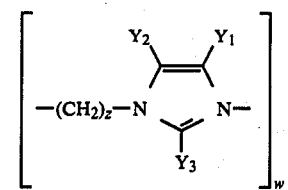

may be used to carry out the process for making molecular sieves, wherein "w" represents the number of repeating units in the polymer chain, and $Y_1$, $Y_2$ and $Y_3$ are as above.

The anion for the salt may be any anion which is not detrimental to the formation of the molecular sieve or zeolite. Iodide and bromide salts of the imidazole are particularly preferred. In carrying out the process of the invention, the proper ratio of hydroxyl ions to silica and/or germanium is essential. Typically, an alkali metal hydroxide, such as the hydroxide of sodium, potassium, lithium, cesium, and rubidium, is used in the reaction mixture; however, this component can be omitted so long as the equivalent basicity is maintained. Under some circumstances the imidazole can provide hydroxide ion.

The reaction mixture is prepared using standard zeolitic preparation techniques. Typical sources of aluminum oxide for the reaction mixture include aluminates, alumina, and aluminum compounds such as $AlCl_3$ and $Al_2(SO_4)_3$. Typical sources of silicon oxide include silicates, silica hydrogel, silicic acid, colloidal silica, tetra-alkyl orthosilicates, and silica hydroxides. Gallium, germanium, and boron can be added in forms corresponding to their aluminum and silicon counterparts. Salts, particularly alkali metal halides, such as sodium chloride, can be added to or formed in the reaction mixture. They are disclosed in the literature as aiding the crystallization of zeolites while preventing silica occlusion in the lattice.

The present process is suitable for preparing "essentially alumina-free" zeolites, i.e., a product having a silica:alumina mole ratio of greater than 200:1, more preferably 1000:1. The term "essentially alumina-free" is used because it is difficult to prepare completely aluminum-free reaction mixtures for synthesizing these materials. Especially when commercial silica sources are used, aluminum is almost always present to a greater or lesser degree. The hydrothermal reaction mixtures from which the essentially alumina-free crystalline siliceous molecular sieves may be prepared can be referred to as being substantially alumina free. By this usage is meant that no aluminum is intentionally added to the reaction mixture, e.g. as an alumnia or aluminate reagent, and that to the extent aluminum is present, it occurs only as a contaminant in the reagents. An additional method of increasing the mole ratio of silica to alumina is by using standard acid leaching or chelating treatments.

DETAILED DESCRIPTION OF THE INVENTION

In preparing a molecular sieve, especially a zeolite, according to the present invention, the imidazole derivative acts as a template during crystallization. Some of the imidazole derivatives are available commercially, but in other instances the imidazole must be prepared. A convenient method for preparing the desired imidazole is to use a readily available starting material such as N-methyl imidazole or imidazole. For example, an imidazole wherein the substitutions on the nitrogen are different may be readily prepared by reacting N-methyl imidazole with an alkyl halide (preferably bromide or iodide) such as ethyl bromide in an organic solvent, such as ethylacetate.

N,N' dialkyl imidazole templates may be prepared by dissolving an imidazole salt in a suitable solvent such as dimethylformamide and adding an appropriate alkyl halide. The resulting product will contain the same alkyl groups on both nitrogen atoms. By applying the general synthesis methods outlined here, one skilled in the art may prepare imidazole derivatives falling within the scope of the general structural formula given above.

In preparing the molecular sieve according to the present invention, the reaction mixture is maintained at an elevated temperature until the crystals of the molecular sieve are formed. The temperatures during the hydrothermal crystallization step are typically maintained from about 100° C. to about 235° C., preferably from about 120° C. to about 165° C. The crystallization period is typically greater than 1 day and preferably from about 3 days to about 50 days.

The hydrothermal crystallization is usually conducted under pressure and usually in an autoclave so that the reaction mixture is subject to autogenous pressure. The reaction mixture can be stirred during crystallization.

Once the molecular sieve crystals have formed, the solid product is separated from the reaction mixture by standard mechanical separation techniques, such as filtration. The crystals are water-washed and then dried, e.g., at 90° C. to 150° C. for from 8 to 24 hours, to obtain the synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals both to direct, and accelerate the crystallization, as well as to minimize the formation of undesired aluminosilicate contaminants. If the reaction mixture is seeded with crystals, the concentration of the imidazole can be somewhat reduced.

The synthetic molecular sieve or zeolite can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica:alumina mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be exchanged into the zeolite. The zeolite can also be impregnated with the metals, or, the metals can be physically intimately admixed with the zeolite using standard methods known to the art. And the metals can be occluded in the crystal lattice by having the desired metals present as ions in the reaction mixture from which the zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The aluminosilicate can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates, sols, or gels, including mixtures of silica and metal oxides. Use of an active material in conjunction with the synthetic zeolite, combined with it, can improve the conversion and selectivity of the catalyst in certain organic conversion processes. Inactive materials can serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be calcined, treated with acid, or chemically modified.

In addition to the foregoing materials, the zeolite can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The zeolite can also be composited with other zeolites such as synthetic and natural faujasites (e.g., X and Y), erionites, and mordenites. They can also be composited with purely synthetic zeolites. The combination of zeolites can also be composited in a porous inorganic matrix.

A number of imidazole templates were prepared which are suitable for synthesizing molecular sieves, especially zeolites.

The preparation of the templates was carried out using one of the three methods outlined in Examples 1–3 below.

EXAMPLE 1

Fifty (50) millimoles of N-methylimidazole is dissolved in 50 ml ethylacetate and cooled to 0° C. in an ice bath. Fifty (50) millimoles of an alkyl halide (preferably bromide or iodide) are added dropwise. After stirring for several hours a precipitate forms. The precipitate is washed with diethyl ether and the product salt is then dried in vacuo. Microanalysis for percent C, H, and N, and proton NMR are used to affirm the correct product structure. This method for preparing the template will hereafter be referred to as Method A.

EXAMPLE 2

Fifty (50) millimoles of imidazole sodium derivative are slurried in 150 cc of dry dimethyl formamide (DMF). Under a continuous stream of dry nitrogen, the slurry is cooled to $-30°$ C. in an isopropanol/$CO_2$ bath. With good stirring, 100 millimoles of the appropriate alkyl halide are added, keeping the reaction below $-30°$ C. for several hours and allowing the mixture to come to room temperature overnight. The sodium halide is filtered and the filtrate concentrated to remove any other sodium halide. Addition of ether and/or acetone causes the crystallization of the desired salt which is recovered.

An alternative strategy, particularly for alkyl bromides, is to only add 1 equivalent of halide at lower temperature, remove the sodium halide formed, and then add another equivalent of the same (or different) halide at 0° C. and gradually bring the temperature up to 50°–60° C. The analysis of the finished product is as above in Example 1. This method of synthesis will be referred to hereafter as Method B.

EXAMPLE 3

Fifty (50) millimoles of imidazole are dissolved in 50 cc of DMF. Fifty millimoles of tributylamine are added and the mixture is stirred while being cooled in an ice bath. One hundred (100) millimoles of an alkyl halide are added with the resulting reaction maintained at 0° C. for several hours and then brought to room temperature overnight. Enough diethyl ether is added to produce a phase separation and then, with vigorous stirring, just enough acetone to produce a cloudy single phase is added. Crystallization will occur either at this point or upon cooling. Work-up and analysis are similar to the other two methods. This method will be referred to hereafter as Method C.

Using the general procedures outlined in Examples 1, 2 and 3, various imidazole templates were prepared. Examples of those actually prepared are shown in the following Table 1.

TABLE 1

The following imidazoles are characterized by the following general structure:

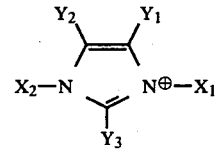

| Example | Template $X_1 =$ | $X_2 =$ | $Y_1 =$ | $Y_2 =$ | $Y_3 =$ | Method of Preparation |
|---|---|---|---|---|---|---|
| 4 | methyl | methyl | H | H | H | A |
| 5 | methyl | ethyl | H | H | H | A |
| 6 | ethyl | ethyl | H | H | H | C |
| 7 | i-propyl | methyl | H | H | H | A |
| 8 | i-propyl | i-propyl | H | H | H | C |
| 9 | n-butyl | n-butyl | H | H | H | A |
| 10 | cyclopentyl | methyl | H | H | H | B |
| 11 | cyclopentyl | cyclopentyl | H | H | H | B |
| 12 | neo-pentyl | neo-pentyl | H | H | H | B |
| 13 | benzyl | methyl | H | H | H | A |
| 14 | benzyl | benzyl | H | H | H | A |
| 15 | 2-hydroxyethyl | ethyl | H | H | H | B |
| 16 | methyl | methyl | H | H | methyl | C |
| 17 | methyl | methyl | H | H | ethyl | C |
| 18 | ethyl | ethyl | H | H | methyl | C |

TABLE 1-continued

The following imidazoles are characterized by
the following general structure:

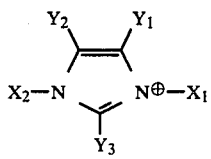

| Example | X₁ = | X₂ = | Y₁ = | Y₂ = | Y₃ = | Method of Preparation |
|---|---|---|---|---|---|---|
| 19 | ethyl | ethyl | H | H | ethyl | C |
| 20 | methyl | neo-pentyl | H | H | H | B |
| 21 | ethyl | ethyl | H | methyl | ethyl | C |
| 22 | methyl | methyl | H | methyl | H | C |
| 23 | methyl | methyl | —C₄H₄— | | H | C |
| 24 | methyl | methyl | —C₄H₄— | | ethyl | A |
| 25 | ethyl | ethyl | —C₄H₄— | | methyl | A |
| 26 | ethyl | ethyl | —C₄H₄— | | H | C |
| 27 | i-propyl | i-propyl | H | H | methyl | C |

Examples 28 to 30 are characterized by the following general structure:

$$R{-}N{\underset{\diagdown}{\diagup}}N^{\oplus}{-}(CH_2)_z{-}N{\underset{\diagdown}{\diagup}}N^{\oplus}{-}R$$

| Example | R = | Z = | Method of Preparation |
|---|---|---|---|
| 28 | methyl | 6 | B |
| 29 | methyl | 12 | B |
| 30 | polymer | 6 | B |

Using the imidazole templates described above, various intermediate pore size zeolites may be prepared. For example, zeolites having typical X-ray diffraction patterns corresponding with ZSM-5 (U.S. Pat. No. 3,702,886), ZSM-12 (U.S. Pat. No. 3,832,449), ZSM-23 (U.S. Pat. No. 4,076,842), theta-1 (European Patent publication No. 0057049A1), and KZ-2 (Zeolites, 3:1 p. 8, 1983) have been prepared using the method of synthesis described herein. A typical synthesis procedure for the zeolite is described below in the following example.

EXAMPLE 31

A first solution is prepared in a Teflon liner of a Parr reactor by dissolving about 8 millimoles of the appropriate imidazole salt in about 6 ml of water followed by 25 millimoles of sodium silicate solution (38.3% solids, SiO₂/Na₂O=3.22). A second solution was prepared containing 0.25 millimoles of Al₂(SO₄)₃.H₂O and 3.8 millimoles of H₂SO₄ (concentrated reagent) in 7.7 ml of water. The second solution was added to the first solution to yield a gel phase. Acid or base was added to adjust the pH to about 10.5. The reactor was closed and heated for six days at 150° C.

Using the general procedure outlined above zeolite crystals displaying X-ray diffraction patterns corresponding to ZSM-12 were prepared using the imidazole templates of Examples 16 and 27. Zeolite crystals having X-ray diffraction patterns corresponding to ZSM-5 were prepared using the same method by employing the templates of Examples 9, 13, 17, and 30. The templates of Examples 7, 8, 12 and 20 were used to prepare zeolites having X-ray diffraction patterns corresponding to ZSM-23. In a similar manner, zeolites having X-ray diffraction patterns similar to theta-1 and KZ-2 were prepared using the imidazole templates of Examples 4, 5, 6 and 28. In general, the process described herein is highly selective for the desired zeolite. Thus, the desired zeolite structure may be obtained in relatively high purity.

The template of Example 4 is particularly useful for preparing zeolite crystals having an X-ray diffraction pattern corresponding to theta-1 and KZ-2. Zeolites corresponding to theta-1 and KZ-2 were prepared in good yield and high purity at relatively mild reaction conditions (100° C. and 130° C.) using this imidazole. Likewise, the imidazoles of Examples 7 and 8 have been found to be particularly useful for the preparation of zeolites having X-ray diffraction patterns corresponding to ZSM-23. Molecular sieves have been prepared from all of the templates exemplified above.

EXAMPLE 32

Five (5) grams of sodium silicate solution (Banco "N" silicate, Na₂O=9.08%, SiO₂=29.22%), 5.6 ml of water and 1.93 grams of N,N' dimethyl imidazolium iodide (iodide salt of Example 4) were mixed in the Teflon cup of the Parr reactor. A second solution of 0.16 grams of Al₂(SO₄)₃.18H₂O (hydrated aluminum sulfate), 0.38 grams of concentrated sulfuric acid, and 7.7 ml of water were added with mixing to form a gel. The pH of the mixture was adjusted to 10.5 with a few drops of 0.1N sodium hydroxide. The reactor was sealed and heated to 150° C. for 6 days with 30 rpm tumbling. Upon cooling, the contents of the reactor were filtered and washed five times with water. The beige solids were air-dried.

The X-ray powder diffraction patterns for the dried solids were determined using standard techniques. The radiation was K-alpha/doublet of copper and a scintillation counter spectrometer with a strip-chart pen recorder was used. The peak heights I and the positions, as a function of 2θ, where θ is the Bragg angle, were read from the spectrometer chart. From these measured values, the relative intensities, 100 I/I₀, where I₀ is the intensity of the strongest line or peak, and d, the interplanar spacing in Angstroms corresponding to the reorded lines, can be calculated. The X-ray diffraction pattern obtained for the product corresponded with the known pattern for theta-1 and KZ-2. The values are given below in Table 2.

TABLE 2

| 2θ | Relative Intensity | d/n |
|---|---|---|
| 8.12 | 66 | 10.89 |
| 10.08 | 14 | 8.77 |
| 12.78 | 19 | 6.93 |
| 16.40 | 9 | 5.40 |
| 19.36 | 11 | 4.58 |
| 20.28 | 100 | 4.379 |
| 24.12 | 94 | 3.690 |
| 24.58 | 67 | 3.622 |
| 25.76 | 55 | 3.458 |
| 26.26 | 3 | 3.394 |
| 26.66 | 8 | 3.344 |
| 26.96 | 6 | 3.307 |
| 27.70 | 2 | 3.220 |
| 30.00 | 2 | 2.979 |
| 30.42 | 5 | 2.938 |
| 30.66 | 3 | 2.916 |

EXAMPLE 33

The zeolite from Example 32 was calcined in a stepped temperature program of 2 hours/200° F. up to 1000° F. for about 8 hours in an atmosphere of $N_2$/air flowing at 25 standard cubic feet per hour. The zeolite was ion-exchanged 4 times with excess $NH_4NO_3$ at reflux for 2 hours for each exchange. Recalcining using the same program produced a hydrogen-exchanged form of the zeolite. The X-ray diffraction pattern of calcined material was taken and compared to the original pattern to confirm thermal stability. The X-ray diffraction pattern is shown below in Table 3 and was found to be substantially indistinguishable from the prior pattern indicating no structural changes in the crystal lattice. The corresponding published values for theta-1 are included in parentheses for comparison.

TABLE 3

| 2θ | Relative Intensity | d/n |
|---|---|---|
| 8.13 (8.15) | 100 (100) | 10.87 (10.85) |
| 10.13 (10.16) | 23 (16) | 8.73 (8.71) |
| 12.78 (12.77) | 28 (16) | 6.93 (6.93) |
| 16.32 (16.36) | 11 (10) | 5.43 (5.42) |
| 16.54 | 4 | 5.36 |
| 19.39 (19.42) | 9 (10) | 4.58 (4.57) |
| 20.32 (20.35) | 83 (77) | 4.37 (4.36) |
| 24.12 | 64 | 3.690 |
| 24.20 (24.22) | 68 (74) | 3.678 (3.70) |
| 24.60 (24.65) | 57 (49) | 3.619 (3.61) |
| 25.71 (25.75) | 42 (23) | 3.465 (3.46) |
| 26.34 | 2 | 3.384 |
| 26.63 | 5 | 3.347 |
| 27.02 | 2 | 3.300 |
| 27.72 | 2 | 3.218 |
| 30.41 | 2 | 2.939 |
| 30.74 | 3 | 2.908 |
| 32.12 | 2 | 2.787 |
| 32.70 | 4 | 2.739 |
| 33.00 | 3 | 2.714 |
| 35.60 (35.63) | 15 (22) | 2.522 (2.52) |

What is claimed is:

1. A method for preparing a molecular sieve having a mole ratio of a first oxide selected from silicon oxide, germanium oxide, and mixtures thereof to a second oxide selected from aluminum oxide, gallium oxide, boron oxide, and mixtures thereof greater than 15 which comprises:

(a) preparing an aqueous mixture containing a mole ratio of a source of a first oxide selected from silicon oxide, germanium oxide and mixtures thereof, to a source of a second oxide selected from aluminum oxide, gallium oxide, boron oxide, and mixtures thereof greater than 2, said mixture also containing sources of an imidazole salt characterized by the general structural formula:

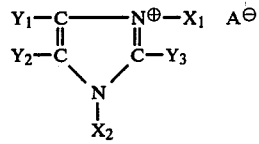

wherein $X_1$ and $X_2$ independently represent a branched or unbranched alkyl containing from 1 to 10 carbon atoms; a branched or unbranched alkyl containing from 1 to 10 carbon atoms substituted by one or more hydroxy, bromo, chloro or iodo; cycloalkyl containing from 5 to 10 carbon atoms; cycloalkyl containing 5 to 10 carbon atoms substituted by branched or unbranched lower alkyl-containing from 1 to 4 carbon atoms; phenyl; benzyl; phenyl substituted by one or more lower alkyl containing 1 to 4 carbon atoms; benzyl substituted by one or more lower alkyl containing 1 to 4 carbon atoms, or a moiety represented by the formula:

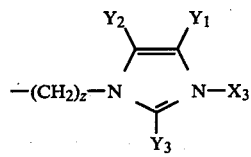

wherein
z is an integer of from 1 to about 20, $X_3$ independently represents the same moieties as represented by $X_1$, and $X_2$, and $Y_1$, $Y_2$ and $Y_3$ are as defined below,
$Y_1$, $Y_2$, and $Y_3$ independently represent hydrogen, halo, hydroxy, and lower alkyl, either branched or unbranched, containing from 1 to about 4 carbon atoms, or alternately $Y_1$ and $Y_2$ may be connected by the bridging group $C_4H_4$ to form a benzimidazole with the imidazole ring, $A^\ominus$ represents an anion which is not detrimental to the formation of the zeolite, and
wherein further said aqueous mixture has a mole ratio of hydroxyl ion to the source of said first oxide within the range of from about 0.2 to about 0.6;

(b) maintaining the aqueous mixture at a temperature of at least 100° C. until the crystals of the desired molecular sieve form; and (c) recovering the crystals of the molecular sieve.

2. The process of claim 1 wherein $X_1$ and $X_2$ represent the same moiety and $Y_1$, $Y_2$ and $Y_3$ are hydrogen.

3. The process of claim 1 wherein $X_1$ and $X_2$ are selected from the group consisting of methyl, ethyl, propyl and isopropyl and $Y_1$, $Y_2$, and $Y_3$ represent hydrogen.

4. The process of claim 1 wherein $X_1$ and $X_2$ represent methyl and $Y_1$, $Y_2$, and $Y_3$ are hydrogen.

5. The process of claim 1 wherein $X_1$ is isopropyl, $X_2$ is methyl and $Y_1$, $Y_2$ and $Y_3$ are hydrogen.

6. The process of claim 1 wherein $X_1$ and $X_2$ are both isopropyl and $Y_1$, $Y_2$ and $Y_3$ are hydrogen.

7. The process of claim 1 wherein the temperature of the aqueous mixture is maintained between 120° C. and 165° C.

8. The process of claim 1 wherein, in preparing the aqueous mixture, the source of the first oxide is for silicon oxide and the source of the second oxide is for aluminum oxide.

9. The process of claim 8 wherein, the mole ratio of the source of silicon oxide to the source of aluminum oxide in the aqueous mixture is greater than 200:1.

10. The process of claim 9 wherein, the mole ratio of the source of silicon oxide to the source of aluminum oxide in the aqueous mixture is greater than 1000:1.

* * * * *

UNITED STATES PATENT AND TRADEMARK OFFICE
CERTIFICATE OF CORRECTION

PATENT NO. : 4,483,835
DATED : November 20, 1984
INVENTOR(S) : Stacey I. Zones

It is certified that error appears in the above–identified patent and that said Letters Patent are hereby corrected as shown below:

Col. 1, line 16, "difficult" should read --different--.

Col. 2, line 8, "or preparing" should read --for preparing--.

Signed and Sealed this

Twenty-first Day of May 1985

[SEAL]

Attest:

DONALD J. QUIGG

Attesting Officer     Acting Commissioner of Patents and Trademarks